United States Patent [19]

Joseph et al.

[11] Patent Number: 5,051,572
[45] Date of Patent: Sep. 24, 1991

[54] PHOTOMULTIPLIER GATING CIRCUIT

[75] Inventors: Alan A. Joseph, Huntington Beach; Russell W. Johnston, Santa Monica; John F. Takacs, Long Beach, all of Calif.

[73] Assignee: McDonnell Douglas Corporation, Long Beach, Calif.

[21] Appl. No.: 505,578

[22] Filed: Apr. 6, 1990

[51] Int. Cl.$^5$ .............................................. H01J 40/14
[52] U.S. Cl. ...................................... 250/207; 313/533
[58] Field of Search ........................ 250/213 VT, 207; 313/532, 533

[56] References Cited

U.S. PATENT DOCUMENTS

| | | | |
|---|---|---|---|
| 3,296,445 | 1/1967 | Roos et al. | 313/533 |
| 3,821,546 | 6/1974 | McClenahan | 250/207 |
| 4,820,914 | 4/1989 | Allen | 313/533 |
| 4,837,482 | 6/1989 | Adachi et al. | 250/213 VT |

Primary Examiner—David C. Nelms
Assistant Examiner—Khaled Shami
Attorney, Agent, or Firm—Curt L. Harrington; Gregory A. Cone; John P. Scholl

[57] ABSTRACT

An advantageous device and method enables a photomultiplier to be gated on and off at electronic rates. A single multi-winding pulse transformer is employed to enable the triggering of the photomultiplier tube.

80 Claims, 3 Drawing Sheets

PHOTOMULTIPLIER GATING CIRCUIT

BACKGROUND OF THE INVENTION

Modern day multi-dynode photomultiplier tubes are often chosen for use in applications wherein some means must be employed to gate, i.e., to electronically turn the tube on or off. Manufacturers, recognizing this application requirement, have designed some of the latest state of the art photomultiplier tubes with an internal grid arrangement which tube data sheets usually state is to be used for the gating function. There are, however, additional design features of many of these tubes which significantly limit the effectiveness of utilizing the grid or grids for gating purposes. This invention and the method of its employment circumvents these limitations.

The photomultiplier tubes under consideration usually consist of a light-receiving photocathode followed by one or more grids, a series of typically up to 10 or more dynodes, and an anode. The last dynode may be laterally distributed in a form of up to as many as 100 dynodes. It is this last dynode or group of dynodes from which the tube output signals are typically taken.

Beyond the photocathode, at least one grid and the first several dynodes are usually slightly optically transparent. The first several dynodes all usually have some degree of photosensitive coating on them so that incoming photons can be converted to photoelectrons at any of these electrodes. This photosensitive coating limits the effectiveness of the grid structure in gating the tube such that the extinction ratio, namely the ratio of the output signal with the photomultiplier tube not gated to output signal with the photomultiplier tube gated, is limited in value.

For many applications, the extinction ratio is deliberately reduced to a level far below the value needed, solely for preventing the photomultiplier tube from saturating. Measures taken to limit the tendency of photomultiplier tubes to saturate, will consequently limit the tube's use in a particular circumstance. The ability to suppress saturation and re-gate the photomultiplier tube will considerably enhance the range of utility of any photomultiplier tube.

SUMMARY OF THE INVENTION

The apparatus and process disclosed, a new photomultiplier gating circuit and method, is far more advantageous than attempting to use the aforementioned grid for the tube gating function for several reasons. First, the invention provides an extinction ratio better than 55 dB in the case wherein the anode bias is not altered and over 80 dB in the case wherein the anode biase is clamped. In addition, the disclosed invention employs only one key component, a three-winding pulse transformer if anode clamping is not employed and a four-winding transformer if the anode is clamped.

From static measurements on a typical photomultiplier tube of the type of concern here, the disclosed circuit is also capable of ultimately providing an extinction ratio of greater than 99 dB. The conventional grid gating approach can seldom provide an extinction ratio greater than 20 dB and may present the problem of high voltage isolation. The high voltage isolation problem concerns the triggering of a high voltage device with a low voltage signal. The problem comes about when the triggering mechanism involves the potential for the high voltage from the device to deleteriously affect the operation of the low voltage triggering device. The disclosed circuit solves the high voltage isolation problem directly by virtue of the inherent isolation properties of a transformer. Table I illustrates a comparison between the known photomultiplier gating scheme methods and the transformer gating of the present invention.

TABLE I

| | Comparison of Photomultiplier Gating Methods | | | | | |
|---|---|---|---|---|---|---|
| | Mechanical shutter | Acousto-optic (A-O) modulator | Liquid crystal light valve (LCLV) | Power supply voltage switching | Grid voltage switching | Transformer gating |
| Minimum speed | several milliseconds | microsecond or fractional microsecond | microseconds | microseconds | microsecond or better | microsecond or better |
| Reliability | poor, moving parts | good, all solid state | good but liquid crystal material may deteriorate with time | medium but parts may be susceptible to high voltage breakdown | high | extremely high |
| Volume required | small | medium | medium to large | medium | small to medium | very small |
| Weight | medium | medium | medium | medium to high | medium | low to very low |
| Cost | low | high | extremely high | medium | low to medium | low to very low |
| Complexity | low | medium | medium | high | medium to high | very low |
| Temperature sensitivity | very little | high | very high | medium | medium | extremely low, if any, in practical applications |
| Aperture size | limited by shutter size | limited by A-O modulator aperture | limited by LCLV aperture | limited only by PMT | limited only by PMT | limited only by PMT |
| Alignment requirements | modest | tight | tight | none | none | none |
| Mechanical considerations | need fixture for shutter | need fixture for A-O modulator | need fixture for LCLV | little | little | almost none |
| Ruggedness | moderately delicate | delicate | very delicate | rugged | rugged | extremely rugged |
| Parts count | low | medium | medium | medium | medium | very low |
| Extinction ratio achievable | >100 dB | 15-30 dB | 15-30 dB | >100 dB | appx. 20 dB max. | 80-100 dB |

Additionally, since a relatively high voltage is required to gate the photomultiplier tube, the transformer can provide this high voltage from a lower voltage source directly by transformer step-up action.

BRIEF DESCRIPTION OF THE DRAWINGS

The structure and method of operation of the invention, together with additional advantages thereof, will be best understood from the following description of specific embodiments when read in connection with the accompanying drawings, in which.

DETAILED DESCRIPTION OF THE PREFERRED EMBODIMENT

Figure 1:
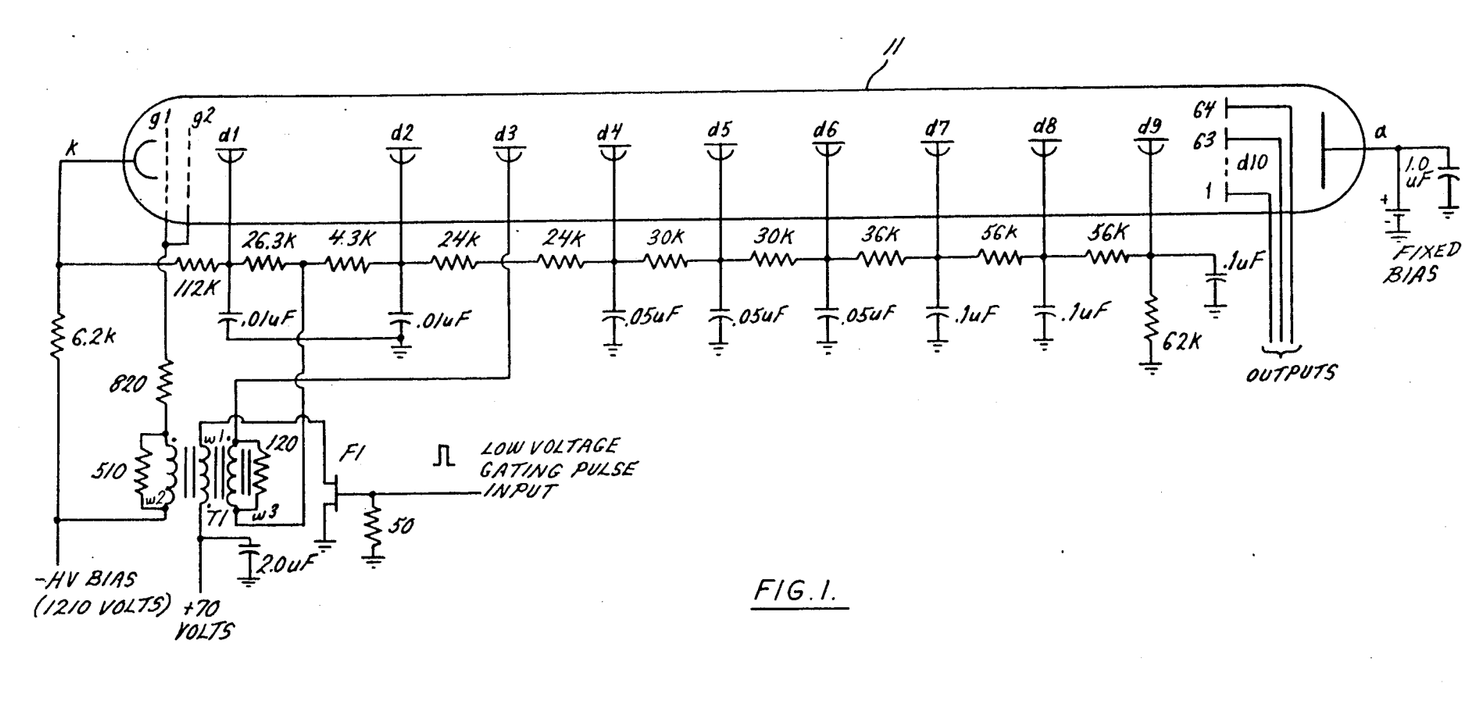
FIG. 1 is a schematic illustration of the photomultiplier system of the present invention including a three-winding transformer.

Referring to FIG. 1, a schematic of the Photomultiplier system of the present invention is illustrated utilizing the three-winding transformer. Across the upper section of FIG. 1, an oval enclosure, or envelope 11 represents the physical boundaries of the photomultiplier tube itself. Within the physically realizable tube, envelope 11 is typically made of metal and glass, and is of sufficient structural integrity to permit evacuation and replacement of the gasses within the envelope 11.

Within the envelope 11, from left to right, are contained the photomultiplier structures including the cathode k, grids g1 and g2, dynodes d1, d2, d3, d4, d5, d6, d7, d8, d9. A series of plates labeled 1, 2, 3, . . . 63 and 64 represents a 64 lateral dynode collection structure comprising dynode d10. At the far right of the envelope 11 is the anode, labeled "a".

The structures shown depict a typical multi-dynode photomultiplier tube. Such a tube is currently commercially available from Amperex Electronic Corporation and is known as model number XP4702. It is described in the literature as a 10 stage, 64 channel photomultiplier tube with a bialkali photocathode, borosilicate glass input window, and a metal dynode electron multiplier.

To give an idea of the physical dimensions of the XP4702, as a typical example of this class of photomultipliers, the active area, namely the area where light to be sensed is received, is about 20 millimeters square. The tube typically responds to light having a range of wavelengths of about 280 to about 620 nanometers.

The manufacturer's literature recommends a series of voltage dividers interspersed between the cathode and the dynodes. However, operation of the tube in accordance with the manufacturer's literature, would include all of the disadvantages currently associated with the current state of photomultiplier tube usage as described in the background section above.

For full disclosure of the specifics of the preferred embodiment, the data on the 10 stage, 64 channel photomultiplier tube is as follows:

The manufacturer recommends that the voltage between each of the dynodes, including dynode $d_{10}$ is $V_d$, and that the voltage between the grid structure g1 & g2 and the first dynode be $2 V_d$. This causes the HV bias voltage between dynode 10 and the grid structure g1 & g2 to become $11 V_d$. It is the departure from the manufacturer's scheme described herein which forms the heart of the invention. The scheme employed herein is also applicable to other similar types of tubes.

Referring to FIG. 1, it is clear that the resistor values utilized and illustrated therein will not yield the voltage drops of the Manufacturer's specification alluded to above. A transformer T1 is shown having terminals which connect to the terminals of the first 3 dynodes d1, d2, d3; grids g1 and g2, and the cathode k. Cathode k is linked to dynode d1 through a 112 k ohm resistor. Dynode d1 is linked to dynode d2 through a 26.3 k ohm resistor connected in series with a 4.3 k ohm resistor. Dynode d2 is connected to dynode d4 through a pair of 24 k ohm resistors connected in series to yield a total resistance between dynode d2 and d4 of 48 k ohm. Note that dynode d3 is not connected to dynodes d2 nor d4 directly through a resistor.

Dynode d4 is connected to dynode d5 and dynode d5 is connected to dynode d6 each by a 30 k ohm resistor. Dynodes d6 and d7 are linked to each other through a 36 k ohm resistor. Dynodes d7 and d8 are connected to each other through a 56 k ohm resistor, as are dynodes d8 and d9. Dynodes d4, d5 and d6 are each connected to ground through a 0.05 microfarad capacitor, while dynodes d7, d8 and d9 are connected to ground each through a 0.1 microfarad capacitor. In addition, dynode d9 is connected to ground through a 62 k ohm resistor. Dynodes d10, which includes all plates 1-64, are connected to a series of lines which traverse the boundary of the tube 11 and are labelled collectively as "outputs".

To the right of tube 11, anode "a" is connected to ground through a 1.0 microfarad capacitor and is also fixed biased with respect to ground with a and is marked "fixed bias" positive voltage potenial on the order of about +40 volts. At the lower left hand side of FIG. 1, the details of the three-winding transformer is shown. Of the three transformer windings, winding w1, the middle winding, is of opposite polarity with the respect to winding w2 on the left and w3 on the right.

These polarity differences are shown by the dots appearing at the ends of the terminals w1, w2 and w3. A 6.2 k ohm resistor connects the cathode k to a negative high voltage bias labelled "-HV Bias (1210 volts)". This negative high voltage bias is connected to one end of winding w2 of transformer T1. The other end of winding w2 is connected through an 820 ohm resistor to grids g1 and g2. The ends of winding w2 are shunted by 510 ohm resistor.

One end of winding w1 of transformer T1 is connected to a positive 70 volt bias and is also connected through a 2.0 microfarad capacitor to ground. The other end of winding w1 is connected to the drain of a field effect transistor, F1. The source of field effect transistor F1 is connected to ground. The gate of field effect transistor F1 is connected to receive a low voltage gating pulse input, which it will later be shown, is used to trigger the photomultiplier tube with the present invention. In addition, the gate of field effect transistor F1 is grounded through a 50 ohm resistor.

Figure 3:
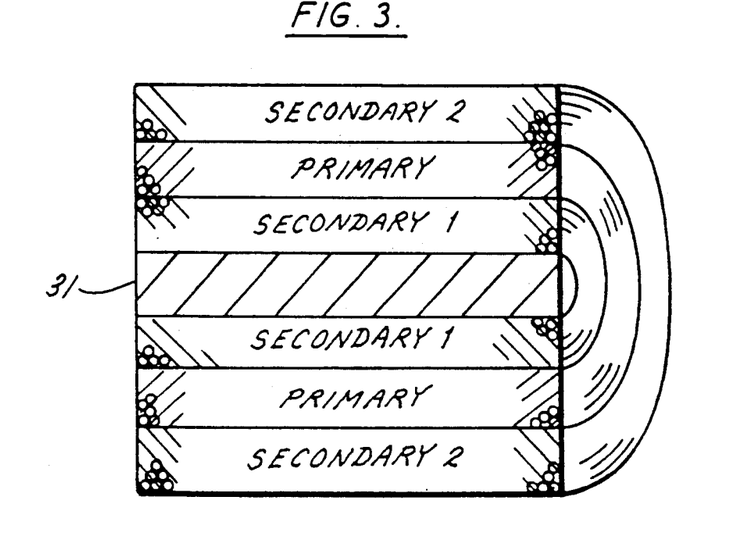
FIG. 3 is a cutaway illustration of a typical three-winding transformer which is utilizable with the photomultiplier system of FIG. 1.; and, FIG. 4 is a cutaway illustration of a typical four-winding transformer, utilizable with the photomultiplier system of FIG. 2.

One end of winding w3 of transformer T1 is connected to a point in between the series connected to 26.3 k ohm and 44.3 k ohm resistors. In this manner, one end of winding w3 of transformer T1 is thereby connected to dynode d2 through the 4.3 k ohm resistor and to dynode d1 through the 26.3 k ohm resistor. The other end of winding w3 of transformer T1 is connected directly to dynode d3. Winding w3 is shunted by 120 ohm resistor. The details of transformer T1 are shown in FIG. 3 and will be discussed below.

Figure 2:
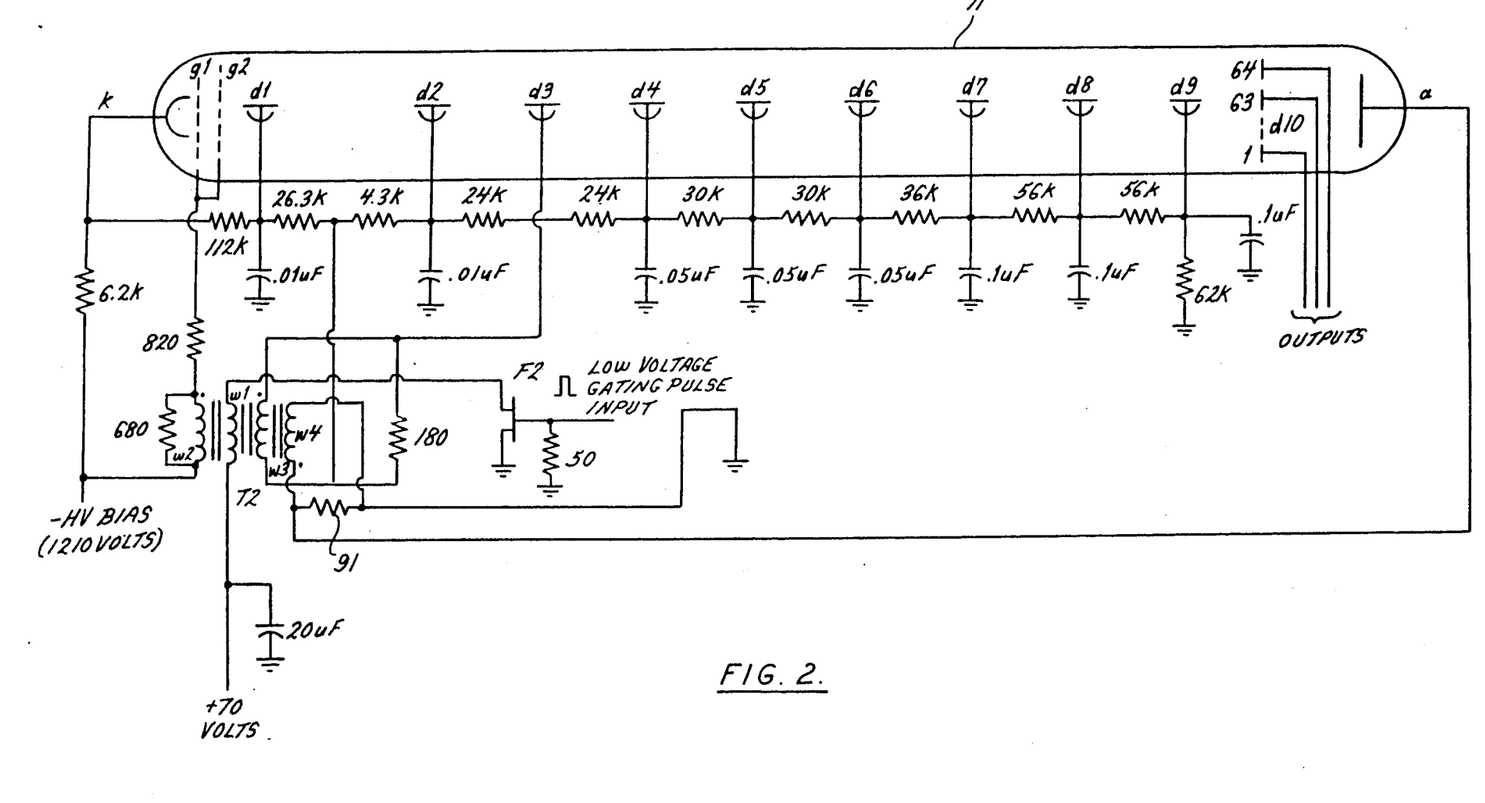
FIG. 2 is a schematic illustration of the photomultiplier system of the present invention including a four-winding transformer.

Referring to FIG. 2, a slightly different configuration and method of operation for the photomultiplier tube of the present invention will be illustrated. As before, we have an envelope 11, cathode k, grids g1 and g2, dynodes d1, d2, d3, d4, d5, d6, d7, d8 and d9. Again, a series of plates labelled 1, 2, 3, . . . 63 and 64 represents the 64 collection structures comprising a dynode d10. At the far right of the envelope 11 is the anode, labeled "a".

Similar to FIG. 1, the photomultiplier tube of FIG. 2 illustrates the grids g1 & g2 connected to the high voltage bias through a 6.2 k ohm resistor. A 112 k ohm resistor links cathode k to dynode d1. A series combination consisting of a 26.3 k ohm resistor in series connection with a 4.3 k ohm resistor links dynodes d1 and d2. Dynodes d4 and d2 are linked with a series combination of two 24 k ohm resistances.

The linkage between dynodes d4 and d5 and between dynodes d5 and d6 are each accomplished through a 30 k ohm resistor. Dynode d6 is connected to dynode d7 through a 36 k ohm resistor. Dynodes d7 and d8 as well as dynodes d8 and d9 are each connectively linked to each other with a 56 k ohm resistor. Dynode d9 is connected to ground through a 62 k ohm resistor. Dynodes d4, d5 and d6 are connected to ground through a 0.05 microfarad capacitor. Dynodes d7, d8 and d9 are connected to ground through a 0.1 microfarad capacitor. Dynodes d1 and d2 are connected to ground through a 0.01 microfarad capacitor.

The lower left side of FIG. 2 is a four-winding transformer T2 having windings w1, w2, w3 and w4. Windings w1 and w4 are of the same polarity with respect to each other. Windings w3 and w2 are of the same polarity with respect to each other but of opposite polarity with respect to windings w4 and w1.

High voltage bias is directly connected to one end of winding w2. The other end of winding w2 is connected to grids g1 and g2 through an 820 ohm resistor. Winding w2 is shunted with a 680 ohm resistor. Winding w1, the primary winding, has one end connected to a +70 volt potential, and also to ground through a 2.0 microfarad capacitor.

The other end of winding w1 is connected to the drain of a field effect transistor F2. The source of field effect transistor F2 is connected to ground. The gate of field effect transistor F2 is connected to receive a low voltage gating pulse input to trigger the photomultiplier tube of the present invention, and is also connected to ground through a 50 ohm resistor.

One end of winding w3 is connected directly to dynode d3. The other end of winding w3 is connected at a point in between the connection of the 26.3 k ohm and 4.3 k ohm resistors such that the other end of winding w3 is connected to dynode d2 through the 4.3 k ohm resistor and to dynode d1 through the 26.3 k ohm resistor. Winding w3 is shunted by a 180 ohm resistor.

Winding w4 has one end connected directly to anode "a". The other end of winding w4 is connected to a fixed voltage bias, typically on the order of 40 volts. Winding w4 is shunted with a 91 ohm resistor.

Despite the differing transformers and transformer arrangements, the dynode voltages of both the configurations of FIG. 1 and FIG. 2 are identical. The following table illustrates the individual dynode voltages during the "idle" condition before triggering, and during the "on" condition after triggering.

TABLE II

| Electrode | Idle volts | % of HV bias | On volts | % of HV bias |
|---|---|---|---|---|
| Vk | −1194 | 98.7 | −1194 | 98.7 |
| Vg1 | −1210 | 100.0 | −904 | 74.7 |
| Vg2 | −1210 | 100.0 | −904 | 74.7 |
| Vd1 | −904 | 74.7 | −904 | 74.7 |
| Vd2 | −824 | 68.1 | −824 | 68.1 |
| Vd3 | −835 | 69.0 | −759 | 62.7 |
| Vd4 | −700 | 57.8 | −700 | 57.8 |
| Vd5 | −622 | 51.4 | −622 | 51.4 |
| Vd6 | −544 | 45.0 | −544 | 45.0 |
| Vd7 | −451 | 37.3 | −451 | 37.3 |
| Vd8 | −306 | 25.3 | −306 | 25.3 |
| Vd9 | −161 | 13.3 | −161 | 13.3 |
| Va(FIG.1) | +40 | | +40 | |
| Va(FIG.2) | 0 | | +40 | |

Note that dynode d3 has a negative voltage of a higher magnitude than dynode d2. This is because dynode d3 is connected to a point in between the 23.3 k ohm and 4.3 k ohm resistors linking dynodes d1 and d2. Note that a fixed bias of about +40 volts is supplied to the anode of the photomultiplier tube in FIG. 1. The anode of the photomultiplier tube in FIG. 2 is connected to ground through W4 and is pulsed to +40 volts during the ON state.

Also notice that a slope function is created along the various dynodes. Slope is defined as rise divided by the run. In this case, the rise is the absolute value of the voltage and the run can be considered the distance in dynodes. Note that the absolute value of the idle voltage between dynode d2 and d3 is a rise of 11 volts. The absolute value of the "on" voltage between dynode d2 and d3 is a drop of 65 volts. Thus the "slope" of the voltage profile went from an 11 volt positive, or rising slope, to a negative 65 volt negative, or decreasing slope. The magnitude of the slope changed by a factor of 65/11 or 5.9, and the sign of the slope reversed. Thus, it can be said that the slope changed by a −5.9 factor; a 5.9 increase in magnitude of the slope with a negative for a change in the direction of the slope.

Note also that for the particular tube illustrated, a positive voltage bias on the anode is necessary for the voltage on dynode d10 to be essentially about zero. An alternate scheme could include the grounding of dynode d10 as the anode, and the measurement of the anode current as an indicator of electron activity at dynode d10. The magnitude of the positive potential of the anode is dependent upon the physical spacing of the anode from the dynode d10, the object being to produce an essentially zero potential at dynode d10. Similarly, the potential of the positive voltage bias could be higher or lower, depending upon its relative distance from the anode "a".

FIG. 3, a cutaway sectional view of the three-winding transformer T1 of FIG. 1 illustrates the construction of T1. In FIG. 1, winding w1 is the primary while winding w2 is the secondary #1 and winding w3 is secondary #2. In FIG. 3, an iron core, 31, concentrates the magnetic field and provides support for the windings. Core 31 is first wound with the secondary #1 winding corresponding to winding w2 of FIG. 1. The next winding is the primary winding corresponding to winding w1 of FIG. 1. The primary winding is followed by an outer winding consisting of secondary #2 corresponding to winding w3 shown in FIG. 1.

Figure 4:
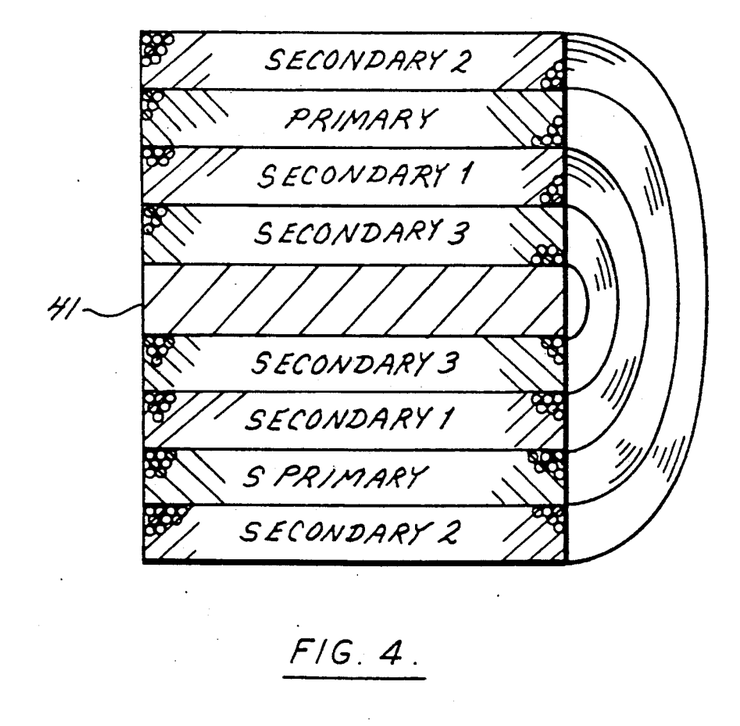

The "recipe" for the transformer of FIG. 3 is as follows:
CORE: FERROXCUBE 3019P-3B7
BOBBIN: 3019FLD
2 LAYERS OF MYLAR TAPE BETWEEN WINDINGS
PRIMARY: 20 TURNS #20 AWG HF
SECONDARY #1: 22 TURNS #21 AWG HF
L SECONDARY #2: 90 TURNS #27 AWG HF FIG. 4 illustrates a perspective sectional view of the preferred embodiment of the four winding transformer T2 shown in FIG. 2. In FIG. 2, winding w1 is the primary while winding w2 is secondary #1, winding w3 is secondary #2 and winding w4 is the secondary #3. In FIG. 4, an iron core, 41, concentrates the magnetic field and provides support for the windings. Core 41 is first wound with the secondary #3 winding corresponding to winding w4 of FIG. 2. The next winding is the secondary #1 winding corresponding to winding w2 of FIG. 2. The next winding is the primary winding corresponding to winding w1 of FIG. 2. The primary winding is followed by an outer winding consisting of a secondary #2 winding corresponding to winding w3 shown in FIG. 2.

The recipe for this transformer is as follows:
CORE: FERROXCUBE 3019P-3B7
BOBBIN: 3019FLD
2 LAYERS OF MYLAR TAPE BETWEEN WINDINGS
PRIMARY: 20 TURNS #20 AWG HF
SECONDARY 1: 22 TURNS #22 AWG HF
SECONDARY 2: 90 TURNS #28 AWG HF
SECONDARY 3: 12 TURNS #22 AWG HF The operation of the photomultiplier gating circuit of the present invention is as follows. For either of the disclosed circuits, the starting condition is that of the tube biased in an off condition which is to say that incident light will not generate a photoelectron current within the tube that would ordinarily produce an output signal were the tube in an on condition. The off condition is set by the bias resistor arrangement coupled with applied voltage routed through the transformer in either circuit to appropriate electrodes of the tube.

This off condition is achieved in the following manner: The grids, in the off or "idle" condition, must be back biased relative to the photocathode. At idle, there is DC bias current flowing in the bias resistor string starting with the 6.2 k ohm resistor. There is virtually no grid current, or such an extremely low grid current, that the grids are caused to be slightly more negative than the photocathode, thereby achieving the back bias condition as described above. Dynode d3 is also back biased relative to dynode d2 in the "off condition". That is, d3 is more negative relative to d2 as it is connected via winding w3 to an earlier point on the resistor bias chain than d2 in order to achieve this condition at idle.

When the tube is desired to be switched to the "on" condition, the pulse input to the transformer T1 of FIG. 1, or T2 of FIG. 2, arithmetically couples to the grids and dynode d3 with the proper voltage value and polarity set by the transformer windings and the series connection of the transformer. When on, all dynodes and the grids are biased so that all inter-electrode relationships permit continuous photoelectron multiplication down the full electrode chain of the tube.

To accomplish this two-condition biasing operation, a high voltage (−1210 volts) is placed on the photocathode via the 6.2 k resistor and also voltage dropped down the dynode resistor chain to all dynodes in succession. The high voltage bias is also placed onto the grids g1 & g2 via winding w2 of the transformers T1 and T2 of FIGS. 1 and 2, respectively.

Note that d3, at idle, is at a potential between dynode d1 and d2 and is also switchable via the w3 winding of the transformers T1 or T2 since winding w3 is in series with this routing. This places d3 at a considerably more negative voltage value than d2 and acts to stop photoelectrons that initiated at d2 and also repels photoelectrons that may have been generated via photoemissive action at either dynode d1 or d2 which can happen in the types of tubes of concern here. D4 is sufficiently shadowed optically by the first three dynodes to not require such a connection as d3.

To determine values of bias at idle, the manufacturer's data is usually consulted for the recommended values between the photocathode and dynode d1 along with empirical data determined experimentally and this sets the value of the 112 k resistor shown along with the manufacturer's recommended biasing string current given expected incident light levels. Open literature on the subject generally has the bias string current at about 10 times the tube photoelectron current.

The back bias condition, in all cases, was determined by tests performed on the photomultiplier in order to determine the interaction of the interelectrode potentials, i.e., grid to photocathode. Tube manufacturers do not usually publish exact dimensional relationship between the electrodes to permit exact calculation of potenials. Destruction, attempted measurement and computation of potentials in an existing tube would be impractical.

A short test to determine the electrode interaction is the most expeditious method for optimizing the tube voltage potentials to operate within the scope of the invention. Tests were made on the following interelectrode potentials to optimize extinction ratio characteristics with variation of these potentials: grid "g1" & "g2" to photocathode "k", dynode "d2" to "d1" and "d3", "d3" to "d2" and "d4", and anode "a" to "d10".

Concerning the balance of the bias string resistor selection, it is desirable to keep space charge limits between dynodes to a magnitude such that linear tube operation is assured over all expected levels of incident light signal. To accomplish this, the bias resistors are selected keeping in mind the bias string current desired. Current literature on this selection can be used as a corroborating guide. Generally, in the pulsed mode, the suggestion is to increase resistor values as necessary since space charge creates back bias conditions between dynodes that decreases overall tube gain and linearity.

The remaining resistor concerned primarily with the biasing is the 820 ohm resistor which is employed as a damper during switching when the tube transitions from an off to an on condition, and is chosen empirically from waveform measurements taken via an oscilloscope during initial tube set-up so as not to tax the high voltage (−HV) bias beyond that needed for quick gating.

The 510 and 120 ohm resistor values, which are in parallel with the w2 and w3 windings of T1 in FIG. 1 respectively and the 680, 180 and 91 ohm resistors which are in parallel with the w2, w3, and w4 windings of T2 in the FIG. 2 respectively, are calculated as part of the transformer designs, along with the 820 ohm grid resistor, to provide critical damping under dynamic switching conditions.

When one of the transformers T1 or T2 are switched, a variation, calculable by series voltage addition, of the relative biasing in existence during the idle condition occurs. In FIG. 2, we have added anode biasing as an aid to increase the performance and have demonstrated the limits of this enhancement by actual laboratory measurements under static conditions with results reported in this disclosure.

The secondary winding damping resistor values for the four-winding transformer configuration of FIG. 2 were calculated so that the total reflected impedance seen by the primary remained equal to the load seen by the three-winding transformer configuration FIG. 1. The loading was determined by test, in the three-winding transformer case, to be the optimum for pulse shaping. The pulse voltages for the four-winding transformer were derived using DC voltages on the tube.

The total load in the three-winding transformer configuration is 55.6 ohms and in the four-winding transformer configuration, is 51.8 ohms, in order to match a source impedance of approximately 50 ohms.

The capacitor selection and placement, was according to the following criteria. When an incident light pulse enters the tube, photo electrons are generated which must be sourced from the bias network. The signal current progressing down the tube electrode string, under these conditions, will tend to perturb the idle bias voltage setting on those electrodes which do not have their bias affected during the tube turn-on action.

To prevent the perturbation of idle bias, which would ordinarily affect gain, capacitors are employed to stabilize the static bias point voltages for a time during the dynamic switching conditions. The values of the various capacitors shown are selected in order to maintain the high frequency response of the photomultiplier tube to a pulsed input charge at the rate at which the photomultiplier tube is used. The capacitors provide the high frequency components of charge during the gating pulse. The resistors which interconnect the capacitors provide the low frequency components of charge between gating pulses.

Note that in a generic sense, each tube has a cathode, followed by a grid, followed by photoemissively coated dynodes, followed by non-photoemissively coated dynodes, followed by an output dynode group, and ending with an anode. In FIGS. 1 and 2, dynodes d1 and d2 are photoemissively coated, whereas dynodes d3 through d10 are not. Dynodes which are photoemissively coated are capable of giving up an electron when illuminated by a photon. Non-photoemissively coated dynodes amplify electrons which strike those dynodes. Photoemissively coated dynodes, when illuminated by photons, produce the source of electrons to be amplified by the non-photoemissively coated dynodes.

Note that the dynode numbering, d1–d10 in FIGS. 1 and 2 refer to the relative closeness of each dynode to the cathode, and consequently from the source of photons Dynode d1 is closest to the "optical opening" end of the tube, dynode d2 is next closest, and so on, through dynode d10.

Referring back to table II, the triggering of the photomultiplier tube involves a change in potential of the grid structure and first non-emissively coated dynode. The other structures in the envelope 11 of the tubes of FIGS. 1 and 2 remain essentially the same. By essentially, is meant that the only fluctuations in voltage potential are insignificant Also significant is the fact that the first non-emissively coated dynode, d3 has a higher magnitude of bias than the adjacent emissively coated dynode, d2, in the idle condition. In the triggered condition, the dynodes follow a cascade potential structure, where each successive dynode has a lesser magnitude potential than the one before it.

By analogy, a tube having one or more photoemissive dynodes and one or more non-photoemissive dynodes could employ the inventive apparatus and process disclosed herein by biasing the photoemissive dynode, adjacent the non-photoemissive diode, at a lesser magnitude potential than that non-photoemissive dynode. This is so, even if there is only one photoemissive dynode and only one non-photoemissive dynode present in the photomultiplier tube.

Further, the voltage relationships for the photomultiplier tube disclosed herein can be applied to other tubes. For another 10 dynode tube, a voltage array to within $\pm 10\%$ of the voltages stated herein is expected to produce results superior to the manufacturer's suggested voltage array. For a tube having more or less dynodes, the individual slope of the voltage potential per dynode, between each dynode will decrease or increase, respectively.

Regardless of the total number of dynodes employed, a reversal of the slope of the voltage potential between the photoemissively coated dynode and its adjacent non-photoemissively coated dynode will always be possible. This is even so in the limiting case of a single photoemissively coated dynode and a single non-photoemissively coated dynode. As is shown in Table II, this slope reversal occurs during the off, or idle condition in the photomultiplier tube.

FIG. 1 illustrates a gated photomultiplier tube with a fixed bias on its anode which produces an extinction ratio over 55 dB as mentioned earlier. FIG. 2 illustrates a variation of FIG. 1 in which the bias on the anode is also altered by transformer action in a manner similar to the dynodes and grids discussed above. Alteration of the anode bias along with the appropriate dynodes and grids has proven to yield an extinction ratio above 80 dB in practice.

The circuit action for FIG. 1 is as follows. Without an incoming pulse to winding w1 of transformer T1, the tube is biased to a DC condition in which the tube is off or inactive with respect to incident photons on its photocathode, k. Note that the photocathode to grid biasing serially contains winding w2 and that the biasing of dynode d3 relative to dynode d1 also has another secondary winding of transformer T1 in that series path, winding w3.

Upon receipt of a gating pulse applied to winding w1 of transformer T1, the secondaries of transformer T1 will change from a zero voltage state to four times the primary pulse voltage in the case of winding w2 and equal to the primary pulse voltage in the case of winding w3 for the typical biasing conditions required by the type of photomultiplier tubes considered here, and as shown in FIG. 1. That is, the pulse transformer, T1, is wound as a 4:1:1 type of pulse transformer.

The biasing of the photocathode relative to grids g1 and g2 and the biasing of dynode d3 relative to dynode d1 is now altered to a condition in which the voltage levels of the electrodes cause the tube to be in an "on" condition which enables the conversion of incoming photons to photoelectrons as in any photomultiplier tube that is properly biased.

Upon removal of the primary pulse on winding w1 of transformer T1, the initial tube-off biasing conditions are restored and the photomultiplier tube reverts to the off condition.

Any circuit that incorporates a pulse transformer, by its very nature, is designed to work with relatively short pulses. In the applications which typically would incorporate the apparatus and process of this invention, such as LIDAR's (Light Detection and Ranging), the "on" pulses, which would be used for range gating, are short. Typically the "on" pulse time may be several microseconds or less with the "off" period ranging from 10's to 100's of microseconds and even to several milliseconds.

Dynodes 4 through 9 are not gated, their bias voltage is purposely un-altered, for two reasons. These dynodes are typically not coated with photosensitive material and, therefore, are not susceptible to producing photoelectrons as do the the earlier dynodes. Secondly, we discovered that a 99 dB extinction ratio can be obtained without having to alter the biasing of dynodes 4 through 9. This very high value of extinction ratio is more than sufficient for the typical applications that would incorporate this invention. In any event, this large extinction ratio is at the limit of what conventional laboratory instrumentation can readily measure, and thus may be actually larger than 99 dB.

The primary use for this circuit is for gating multiple-dynode photomultiplier tubes in a fashion that provides a far superior extinction ratio than the usual method of attempting to gate the grids of such tubes as the manufacturer's data usually suggests. The use of a single passive component, a multi-winding pulse transformer employed to electronically reverse the static bias conditions on the tube while providing far superior extinction ratio and high voltage isolation simultaneously, is extremely valuable.

Second, the selection of the particular electrodes to perform reversal upon is not obvious.

Thirdly, the manipulation of the anode circuit, either by adding a forth winding to the transformer T1, maintaining the single key component gating feature, or by other means such as an analog to digital converter or simple pulsed analog amplifier, improves the extinction ratio further to over 80 dB.

This much improved extinction ratio is mandatory for LIDAR (light detection and ranging) applications. Any other applications which employ a gated photomultiplier tube requiring a high extinction ratio would greatly benefit from the use of the disclosed circuit.

The forgoing disclosure and description of the invention are illustrative and explanatory thereof, and various changes in the orientation and spacing of the dynodes, transformer gating recipe, type of photomultiplier tube employed, type of isolation in the triggering scheme, orientation of the wiring, materials of construction, high voltage bias, and changes to effect the desired photoelectric performance characteristics to be achieved, as well as in the details of the illustrated embodiments, may be made without departing from the spirit and scope of the invention.

What is claimed is:

1. a photomultiplier tube system comprising:
    a photomultiplier tube having a cathode for receiving a negative high voltage potential, an anode, at least three dynodes, namely a first and a second photoemissive dynode and a third non-photoemissive dynode and at least one grid; and,
    trigger means, connected to said at least three dynodes, said cathode and said at least one grid of said photomultiplier tube, for receiving a gating pulse input and for changing the voltage potential of said at least one grid, and said third dynode, simultaneously.

2. The photomultiplier tube system of claim 1 wherein said trigger means changes said voltage potential of said at least one grid and said third dynode by utilizing induction.

3. The photomultiplier tube system of claim 2 wherein said trigger means further comprises:
    a transistor having a gate for receiving a gating pulse input, a grounded source, and a drain; and,
    inductive transfer means, connected to said drain of said transistor, said cathode and to said at least three dynodes and at least one grid of said photomultiplier tube.

4. The photomultiplier tube system of claim 2 wherein said inductive transfer means is also connected to said anode.

5. The photomultiplier tube system of claim 3 wherein said inductive transfer means further comprises:
    a transformer having at least one primary winding and at least two secondary windings, said primary winding having a first end connected to said drain of said transistor and a second end for receiving a positive voltage source, and the first of said at least two secondary windings having a first end connected to said at least one grid, and having a second end for receiving said negative high voltage potential, and the second of said at least two secondary windings having a first end connected to said third dynode and a second end connected to said first and said second dynodes.

6. The photomultiplier tube system of claim 5 wherein said transformer has a winding ratio of turns of said first secondary to said second secondary to said primary of 4:1:1.

7. The photomultiplier tube system of claim 5 wherein said at least two secondary windings are of opposite polarity with respect to said at least one primary winding.

8. The photomultiplier tube system of claim 5 and further comprising:
    a first resistor; and,
    a second resistor, wherein said second end of said second secondary winding is connected to said first and said second dynodes through said first and second resistors, respectively.

9. The photomultiPlier tube system of claim 8 and further comprising a grid resistor, and wherein said first end of the first of said at least two secondary windings is connected to said at least one grid through said grid resistor.

10. The photomultiplier tube system of claim 9 and further comprising:
    a cathode resistor, connected between said second end of said first of said at least two secondary windings, and said cathode; and,
    a first link resistor connected between said cathode and said first dynode.

11. The photomultiplier tube system of claim 10 wherein said photomultiplier tube has ten dynodes, namely said first, said second, said third, and fourth, fifth, sixth, seventh, eighth, ninth and tenth dynodes, and further comprising:

a second link resistor connected between said second and said fourth dynode;

a third link resistor connected between said fourth and said fifth dynode;

a fourth link resistor connected between said fifth and said sixth dynode;

a fifth link resistor connected between said sixth and said seventh dynode;

a sixth link resistor connected between said seventh and said eighth dynode;

a seventh link resistor connected between said eighth and said ninth dynode; and, an eighth link resistor connected between said ninth dynode and ground.

12. The photomultiplier tube system of claim 11 further comprising 8 dynode capacitors and wherein said first, second, fourth, fifth, sixth, seventh, eighth and ninth, dynodes are each connected to one end of one of said eight dynode capacitors, and the other ends of said eight dynode capacitors are connected to ground.

13. The photomultiplier tube system of claim 12 further comprising:

a transformer grounding capacitor having one end connected to said second end of said primary winding and having another end connected to ground;

a first shunt resistor connected between said first and said second ends of said first secondary winding;

a second shunt resistor connected between said first and said second ends of said second secondary winding;

an anode capacitor connected between said anode and ground; and, a gate resistor connected between said gate of said transistor and ground.

14. The photomultiplier tube system of claim 13 wherein said first resistor has a value of about 26.3 k ohms,
said second resistor has a value of about 4.3 k ohms,
said grid resistor has a value of about 820 ohms,
said cathode resistor has a value of about 6.2 k ohms,
said first link resistor has a value of about 112 k ohms,
said second link resistor has a value of about 48 k ohms,
said third link resistor has a value of about 30 k ohms
said fourth link resistor has a value of about 30 k ohms
said fifth link resistor has a value of about 36 k ohms,
said sixth link resistor has a value of about 56 k ohms,
said seventh link resistor has a value of about 56 k ohms,
said eighth link resistor has a value of about 62 k ohms,
the dynode capacitors connected to the said first and second dynodes have a value of about 0.01 microfarads;
the seventh, eighth and ninth dynodes have a value of about 0.1 microfarads,
the dynode capacitors connected to the said fourth, fifth, and sixth dynodes have a value of about 0.05 microfarads,
said transformer grounding capacitor has a value of about 2.0 microfarads,
said first shunt resistor has a value of about 510 ohms,
said second shunt resistor has a value of about 120 ohms,
said anode capacitor has a value of about 1.0 microfarad, and,
said gate resistor has a value of about 50 ohms.

15. The photomultiplier tube system of claim 14 having two grids.

16. a photomultiplier tube system comprising:

a photomultiPlier tube having a cathode for receiving a negative high voltage potential, an anode, at least three dynodes, namely a first and a second photoemissive dynode and a third non-photoemissive dynode and at least one grid; and, trigger means, connected to said at least three dynodes, said cathode, said anode, and at least one grid of said photomultiplier tube, for receiving a gating pulse input and for changing the voltage potential of said third dynode and said at least one grid simultaneously.

17. The photomultiplier tube system of claim 16 wherein said trigger means changes said voltage potential of said third dynode and said at least one grid using induction.

18. The photomultiplier tube system of claim 17 wherein said trigger means further comprises:

a transistor having a gate for receiving a gating pulse input, a grounded source, and a drain; and, inductive transfer means, connected to said drain of said transistor, said cathode, said anode, and to said at least three dynodes and at least one grid of said photomultiplier tube.

19. The photomultiplier tube system of claim 18 wherein said inductive transfer means further comprises:

a transformer having at least one primary winding and at least three secondary windings, said primary winding having a first end connected to said drain of said transistor and a second end for receiving a positive voltage source, and the first of said at least three secondary windings having a first end connected to said at least one grid, and having a second end for receiving said negative high voltage potential, and the second of said at least three secondary windings having a first end connected to said third dynode and a second end connected to said first and said second dynodes, and the third of said at least three secondary windings having a first end for receiving a fixed voltage bias and a second end connected to said anode.

20. The photomultiplier tube system of claim 19 wherein said transformer has a winding ratio of turns of said first secondary to said second secondary to said third secondary to said primary of 11:14:11:10.

21. The photomultiplier tube system of claim 19 wherein said at least two secondary windings are of opposite polarity with respect to said at least one primary winding, and at least one secondary winding is of the same polarity with respect to said at least one primary winding.

22. The photomultiplier tube system of claim 19 and further comprising:

a first resistor; and, a second resistor, wherein said second end of said second secondary winding is connected to said first and said second dynodes through said first and second resistors, respectively.

23. The photomultiplier tube system of claim 22 and further comprising a grid resistor, and wherein said first end of the first of said at least three secondary windings is connected to said at least one grid through said grid resistor.

24. The photomultiplier tube system of claim 23 and further comprising:

a cathode resistor, connected between said second end of said first of said at least three secondary windings, and said cathode; and, a first link resistor connected between said cathode and said first dynode.

25. The photomultiplier tube system of claim 24 wherein said photomultiplier tube has ten dynodes, namely said first, said second, said third, and fourth, fifth, sixth, seventh, eighth, ninth and tenth dynodes, and further comprising:

a second link resistor connected between said second and said fourth dynode;

a third link resistor connected between said fourth and said fifth dynode;

a fourth link resistor connected between said fifth and said sixth dynode;

a fifth link resistor connected between said sixth and said seventh dynode;

a sixth link resistor connected between said seventh and said eighth dynode;

a seventh link resistor connected between said eighth and said ninth dynode; and, an eighth link resistor connected between said ninth dynode and ground.

26. The photomultiplier tube system of claim 25 further comprising 8 dynode capacitors and wherein said first, second, fourth, fifth, sixth, seventh, eighth and ninth, dynodes are each connected to one end of one of said eight dynode capacitors, and the other ends of said eight dynode capacitors are connected to ground.

27. The photomultiplier tube system of claim 26 further comprising:

a transformer grounding capacitor having one end connected to said second end of said primary winding and having another end connected to ground;

a first shunt resistor connected between said first and said second ends of said first secondary winding;

a second shunt resistor connected between said first and said second ends of said second secondary winding;

a third shunt resistor connected between said first and said second ends of said third secondary winding; and, a gate resistor connected between said gate of said transistor and ground.

28. a photomultiplier tube system comprising:

a photomultiplier tube having an optical inlet, a cathode for receiving a negative high voltage potential, an anode, at least one photoemissive dynode, at least one non-photoemissive dynode and at least one grid; and, trigger means, connected to said cathode, said anode, said at least one grid, and at least one of said at least one said non-photoemissive diode nearest said optical inlet with respect to all of said at least one said non-photoemissive diodes, for receiving a gating pulse input and for changing the voltage potential of said at least one of said at least one said non-photoemissive diode and said at least one grid, simultaneously.

29. The photomultiplier tube system of claim 28 wherein said trigger means changes said voltage potential of said at least one of said at least one said non-photoemissive diode and said at least one grid by utilizing induction.

30. The photomultiplier tube system of claim 28 wherein said trigger means further comprises:

a transistor having a gate for receiving a gating pulse input, a grounded source, and a drain; and, inductive transfer means, connected to said drain of said transistor, to said cathode and to said at least one of said at least one non-photoemissive dynode and at least one grid of said photomultiplier tube.

31. The photomultiplier tube system of claim 30 wherein said inductive transfer means is also connected to said anode.

32. a photomultiplier tube system comprising:

a photomultiplier tube having a cathode for receiving a negative high voltage potential, an anode, at least one photoemissively coated dynode, at least one non-photoemissively coated dynode, and at least one grid, and wherein at least one single non-photoemissively coated dynode is located adjacent said at least one photoemissively coated dynode; and, trigger means, connected to said at least one single non-photoemissively coated dynode, for receiving a gating pulse input and for changing the voltage potential of said at least one single non-photoemissively coated dynode to a magnitude less than the magnitude of the voltage potential of the smallest voltage magnitude of said at least one photoemissively coated dynode.

33. The photomultiplier tube system of claim 32 wherein said voltage potential of said at least one single non-photoemissively coated dynode is reduced in magnitude by an amount of from 0% to 15% below the magnitude of the voltage potential of the smallest voltage magnitude of said at least one photoemissively coated dynode.

34. The photomultiplier tube system of claim 32 wherein said voltage potential of said at least one single non-photoemissively coated dynode is reduced in magnitude by an amount of about 8% below the magnitude of the voltage potential of the smallest voltage magnitude of said at least one photoemissively coated dynode.

35. The photomultiplier tube system of claim 32 wherein said trigger mean utilizes induction.

36. The photomultiplier tube system of claim 32 wherein said trigger means further comprises:

a transistor having a gate for receiving a gating pulse input, a grounded source, and a drain; and, inductive transfer means, connected to said drain of said transistor, and said at least one single said non-emissively coated dynode.

37. The photomultiplier tube system of claim 36 wherein said inductive transfer means is also connected to said anode.

38. The photomultiplier tube system of claim 36 wherein said inductive transfer means further comprises:

a transformer having at least one primary winding and at least one secondary winding, one of said at least one primary winding having a first end connected to said drain of said transistor and a second end for receiving a positive voltage source, and one of said at least one secondary windings having a first end connected to said at least one single non-photoemissively coated dynode and a second end connected to said at least one photoemissively coated dynode.

39. The photomultiplier tube system of claim 38 wherein said transformer has a winding ratio of turns of said one of at least one secondary winding to said one of said at least one primary winding of 4:1.

40. The photomultiplier tube system of claim 39 wherein said one of at least one secondary winding is of opposite polarity with respect to said at least one primary winding.

41. The photomultiplier tube system of claim 39 and further comprising:
at least one emissively coated dynode resistor, wherein said second end of said one of said at least one secondary winding is connected to each of said at least one emissively coated dynodes through its associated single one of said at least one emissively coated dynode resistor.

42. The photomultiplier tube system of claim 41 and further comprising a first link resistor connected between said cathode and one of said at least one emissively coated dynode.

43. The photomultiplier tube system of claim 42 wherein said photomultiplier tube has ten dynodes, namely a first and a second emissively coated dynode, and a third, fourth, fifth, sixth, seventh, eighth, ninth and tenth non-emissively coated dynodes, and further comprising:
a second link resistor connected between said second and said fourth dynode;
a third link resistor connected between said fourth and said fifth dynode;
a fourth link resistor connected between said fifth and said sixth dynode;
a fifth link resistor connected between said sixth and said seventh dynode;
a sixth link resistor connected between said seventh and said eighth dynode;
a seventh link resistor connected between said eighth and said ninth dynode; and,
an eighth link resistor connected between said ninth dynode and ground.

44. The photomultiplier tube system of claim 43 further comprising 8 dynode capacitors and wherein said first, second, fourth, fifth, sixth, seventh, eighth and ninth, dynodes are each connected to one end of one of said eight dynode capacitors, and the other ends of said eight dynode capacitors are connected to ground.

45. The photomultiplier tube system of claim 44 further comprising:
a transformer grounding capacitor having one end connected to said second end of said one of at least one primary winding and having another end connected to ground;
a first shunt resistor connected between said first and said second ends of said one of said at least one secondary winding;
an anode capacitor connected between said anode and ground; and,
a gate resistor connected between said gate of said transistor and ground.

46. The photomultiplier tube system of claim 44, including a first and a second emissively coated dynode resistor, and wherein
said first emissively coated dynode resistor has a value of about 26.3 k ohms,
said second emissively coated dynode resistor has a value of about 4.3 k ohms,
said cathode resistor has a value of about 6.2 k ohms,
said first link resistor has a value of about 112 k ohms,
said second link resistor has a value of about 48 k ohms,
said third link resistor has a value of about 30 k ohms
said fourth link resistor has a value of about 30 k ohms
said fifth link resistor has a value of about 36 k ohms,
said sixth link resistor has a value of about 56 k ohms,
said seventh link resistor has a value of about 56 k ohms,
said eighth link resistor has a value of about 62 k ohms,
the dynode capacitors connected to the said first and second dynodes have a value of about 0.01 microfarads;
the seventh, eighth and ninth dynodes have a value of about 0.1 microfarads,
the dynode capacitors connected to the said fourth, fifth, and sixth dynodes have a value of about 0.05 microfarads,
said transformer grounding capacitor has a value of about 2.0 microfarads,
said first shunt resistor has a value of about 510 ohms,
said second shunt resistor has a value of about 120 ohms,
said anode capacitor has a value of about 1.0 microfarad, and,
said gate resistor has a value of about 50 ohms.

47. The photomultiplier tube system of claim 46 having two grids.

48. a photomultiplier tube system comprising:
a photomultiplier tube having a cathode for receiving a negative high voltage potential, an anode, at least one photoemissively coated dynode, at least one non-photoemissively coated dynode, and at least one grid, and wherein said at least one single non-photoemissively coated dynode is located adjacent said at least one photoemissively coated dynode; and,
trigger means, connected to said at least one single non-photoemissively coated dynode, for reversing the slope of the potential between said at least one single non-photoemissively coated dynode and the one of said at least one photoemissively coated dynode having the smallest magnitude voltage potential, when the tube is in the idle condition, and for restoring the slope of the potential between said at least one single non-photoemissively coated dynode and the one of said at least one photoemissively coated dynode having the smallest magnitude voltage potential, when the tube is in the on condition.

49. The photomultiplier tube system of claim 48 wherein said slope of the potential between said at least one single non-photoemissively coated dynode and the one of said at least one photoemissively coated dynode having the smallest magnitude voltage potential, is changed by a factor of between $-5.31$ and $-6.49$.

50. The photomultiplier tube system of claim 48 wherein said slope of the potential between said at least one single non-photoemissively coated dynode and the one of said at least one photoemissively coated dynode having the smallest magnitude voltage potential, is changed by a factor of about $-5.31$.

51. The photomultiplier tube system of claim 48 wherein said trigger means utilizes induction.

52. The photomultiplier tube system of claim 48 wherein said trigger means further comprises:
a transistor having a gate for receiving a gating pulse input, a grounded source, and a drain; and, inductive transfer means, connected to said drain of said transistor, and said at least one single said non-emissively coated dynode.

53. The photomultiplier tube system of claim 52 wherein said inductive transfer means is also connected to said anode.

54. The photomultiplier tube system of claim 52 wherein said inductive transfer means further comprises:
   a transformer having at least one primary winding and at least one secondary winding, one of said at least one primary winding having a first end connected to said drain of said transistor and a second end for receiving a positive voltage source, and one of said at least one secondary winding having a first end connected to said at least one single non-photoemissively coated dynode and a second end connected to said one of said at least one photoemissively coated dynode.

55. The photomultiplier tube system of claim 54 wherein said transformer has a winding ratio of turns of said one of said at least one secondary to said one of said at least one primary of 4:1.

56. The photomultiplier tube system of claim 54 wherein said one of said at least one secondary winding is of opposite polarity with respect to said one of said at least one primary winding.

57. The photomultiplier tube system of claim 54 and further comprising:
   at least one resistor, wherein said second end of said at least one secondary winding is connected to each of said at least one emissively coated dynodes through one of said at least one resistor.

58. The photomultiplier tube system of claim 57 and further comprising a grid resistor, and wherein said first end of the first of said at least one secondary winding is connected to said at least one grid through said grid resistor.

59. The photomultiplier tube system of claim 58 and further comprising:
   a cathode resistor, connected between said second end of said one of said at least one secondary winding, and said cathode; and,
   a first link resistor connected between said cathode and one of said at least one emissively coated dynode.

60. The photomultiplier tube system of claim 59 wherein said photomultiplier tube has ten dynodes, namely a first and a second emissively coated dynode, and a third, fourth, fifth, sixth, seventh, eighth, ninth and tenth non-emissively coated dynodes, and further comprising:
   a second link resistor connected between said second and said fourth dynode;
   a third link resistor connected between said fourth and said fifth dynode;
   a fourth link resistor connected between said fifth and said sixth dynode;
   a fifth link resistor connected between said sixth and said seventh dynode;
   a sixth link resistor connected between said seventh and said eighth dynode;
   a seventh link resistor connected between said eighth and said ninth dynode; and,
   an eighth link resistor connected between said ninth dynode and ground.

61. The photomultiplier tube system of claim 60 further comprising 8 dynode capacitors and wherein said first, second, fourth, fifth, sixth, seventh, eighth and ninth, dynodes are each connected to one end of one of said eight dynode capacitors, and the other ends of said eight dynode capacitors are connected to ground.

62. The photomultiplier tube system of claim 61 further comprising:
   a transformer grounding capacitor having one end connected to said second end of said one of said at least one primary winding and having another end connected to ground;
   a first shunt resistor connected between said first and said second ends of said one of said at least one secondary winding, and where a second secondary winding is present;
   a second shunt resistor connected between said first and said second ends of said second secondary winding;
   an anode capacitor connected between said anode and ground; and,
   a gate resistor connected between said gate of said transistor and ground.

63. The photomultiplier tube system of claim 62 wherein
   said first resistor has a value of about 26.3 k ohms,
   said second resistor has a value of about 4.3 k ohms,
   said grid resistor has a value of about 820 ohms,
   said cathode resistor has a value of about 6.2 k ohms,
   said first link resistor has a value of about 112 k ohms,
   said second link resistor has a value of about 48 k ohms,
   said third link resistor has a value of about 30 k ohms
   said fourth link resistor has a value of about 30 k ohms
   said fifth link resistor has a value of about 36 k ohms,
   said sixth link resistor has a value of about 56 k ohms,
   said seventh link resistor has a value of about 56 k ohms,
   said eighth link resistor has a value of about 62 k ohms,
   the dynode capacitors connected to the said first and second dynodes have a value of about 0.01 microfarads;
   the seventh, eighth and ninth dynodes have a value of about 0.1 microfarads,
   the dynode capacitors connected to the said fourth, fifth, and sixth dynodes have a value of about 0.05 microfarads,
   said transformer grounding capacitor has a value of about 2.0 microfarads,
   said first shunt resistor has a value of about 510 ohms,
   said second shunt resistor has a value of about 120 ohms,
   said anode capacitor has a value of about 1.0 microfarad, and,
   said gate resistor has a value of about 50 ohms.

64. The photomultiplier tube system of claim 63 having two grids.

65. a photomultiplier tube system comprising:
   a photomultiplier tube having a cathode for receiving a negative high voltage potential, an anode, at least one photoemissively coated dynode, at least one non-photoemissively coated dynode, and at least one grid, and wherein said at least one single non-photoemissively coated dynode is located adjacent said at least one photoemissively coated dynode; and,
   trigger means, connected to said at least one grid, for reducing the magnitude of the voltage of the grid approximately equal to the magnitude of the voltage of the at least one photoemissively coated dynode having the highest magnitude voltage potential, when the tube is in the on condition, and for restoring the magnitude of the voltage of the grid above the magnitude of the voltage of the at least one photoemissively coated dynode having the highest magnitude voltage potential, when the tube is in the idle condition.

66. The photomultiplier tube system of claim 65 wherein said trigger means utilizes induction.

67. The photomultiplier tube system of claim 65 wherein said trigger means further comprises:
a transistor having a gate for receiving a gating pulse input, a grounded source, and a drain; and,
inductive transfer means, connected to said drain of said transistor, and said at least one grid.

68. The photomultiplier tube system of claim 67 wherein said inductive transfer means is also connected to said anode.

69. The photomultiplier tube system of claim 67 wherein said inductive transfer means further comprises:
a transformer having at least one primary winding and at least one secondary winding, one of said at least one primary winding having a first end connected to said drain of said transistor and a second end for receiving a positive voltage source, and one of said at least one secondary windings having a first end connected to said at least one grid, and having a second end for receiving said negative high voltage potential.

70. The photomultiplier tube system of claim 69 wherein said transformer has a winding ratio of turns of said one of said at least one secondary to said one of said at least one primary of 4:1.

71. The photomultiplier tube system of claim 69 wherein said one of said at least one secondary winding is of opposite polarity with respect to said one of at least one primary winding.

72. The photomultiplier tube system of claim 71 and further comprising:
at least one resistor, wherein said second end of said one of said at least one secondary winding is connected to each one of said at least one emissively coated dynodes through its associated said at least one resistor.

73. The photomultiplier tube system of claim 72 and further comprising a grid resistor, and wherein said first end of said one of said at least one secondary winding is connected to said at least one grid through said grid resistor.

74. The photomultiplier tube system of claim 73 and further comprising:
a cathode resistor, connected between said second end of said one of said at least one secondary winding, and said cathode; and,
a first link resistor connected between said cathode and one of said at least one emissively coated dynode.

75. The photomultiplier tube system of claim 74 wherein said photomultiplier tube has ten dynodes, namely a first and a second emissively coated dynode, and a third, fourth, fifth, sixth, seventh, eighth, ninth and tenth non-emissively coated dynodes, and further comprising:
a second link resistor connected between said second and said fourth dynode;
a third link resistor connected between said fourth and said fifth dynode;
a fourth link resistor connected between said fifth and said sixth dynode;
a fifth link resistor connected between said sixth and said seventh dynode;
a sixth link resistor connected between said seventh and said eighth dynode;
a seventh link resistor connected between said eighth and said ninth dynode; and,
an eighth link resistor connected between said ninth dynode and ground.

76. The photomultiplier tube system of claim 75 further comprising 8 dynode capacitors and wherein said first, second, fourth, fifth, sixth, seventh, eighth and ninth, dynodes are each connected to one end of one of said eight dynode capacitors, and the other ends of said eight dynode capacitors are connected to ground.

77. The photomultiplier tube system of claim 76 further comprising:
a transformer grounding capacitor having one end connected to said second end of said one of said at least one primary winding and having another end connected to ground;
a first shunt resistor connected between said first and said second ends of said one of said at least one secondary winding;
an anode capacitor connected between said anode and ground; and,
a gate resistor connected between said gate of said transistor and ground.

78. The photomultiplier tube system of claim 77 wherein
said first resistor has a value of about 26.3 k ohms,
said second resistor has a value of about 4.3 k ohms,
said grid resistor has a value of about 820 ohms,
said cathode resistor has a value of about 6.2 k ohms,
said first link resistor has a value of about 112 k ohms,
said second link resistor has a value of about 48 k ohms,
said third link resistor has a value of about 30 k ohms
said fourth link resistor has a value of about 30 k ohms
said fifth link resistor has a value of about 36 k ohms,
said sixth link resistor has a value of about 56 k ohms,
said seventh link resistor has a value of about 56 k ohms,
said eighth link resistor has a value of about 62 k ohms,
the dynode capacitors connected to the said first and second dynodes have a value of about 0.01 microfarads;
the seventh, eighth and ninth dynodes have a value of about 0.1 microfarads,
the dynode capacitors connected to the said fourth, fifth, and sixth dynodes have a value of about 0.05 microfarads,
said transformer grounding capacitor has a value of about 2.0 microfarads,
said first shunt resistor has a value of about 510 ohms,
said anode capacitor has a value of about 1.0 microfarad, and,
said gate resistor has a value of about 50 ohms.

79. The photomultiplier tube system of claim 78 having two grids.

80. a photomultiplier tube system comprising:
a photomultiplier tube having a cathode for receiving a negative high voltage potential, an anode, at least one photoemissively coated dynode, at least one non-photoemissively coated dynode, and at least one grid, and wherein said at least one single non-photoemissively coated dynode is located adjacent said at least one photoemissively coated dynode; and, trigger means, connected to said at least one grid, for reducing the magnitude of the voltage of the grid approximately equal to the magnitude of the voltage of the at least one photoemissively coated dynode having the highest magnitude voltage potential, and for changing the voltage potential of said at least one single non-photoemissively coated dynode to a magnitude less than the magnitude of the voltage potential of the smallest voltage magnitude of said at least one photoemissively coated dynode when the tube is in the on condition, and for restoring the magnitude of the voltage of the grid above the magnitude of the voltage of the at least one photoemissively coated dynode having the highest magnitude voltage potential, and for restoring the voltage potential of said at least one single non-photoemissively coated dynode to a magnitude greater than the magnitude of the voltage potential of the smallest voltage magnitude of said at least one photoemissively coated dynode when the tube is in the idle condition.

* * * * *